No. 776,419. PATENTED NOV. 29, 1904.
C. H. PLATT.
PAVEMENT.
APPLICATION FILED OCT. 21, 1903.
NO MODEL. 4 SHEETS—SHEET 1.

Witnesses
F. H. Schott
[signature]

Inventor
Charles H. Platt

By Philipp, Sawyer, Rice & Kennedy
his Attorneys

No. 776,419. PATENTED NOV. 29, 1904.
C. H. PLATT.
PAVEMENT.
APPLICATION FILED OCT. 21, 1903.
NO MODEL. 4 SHEETS—SHEET 2.
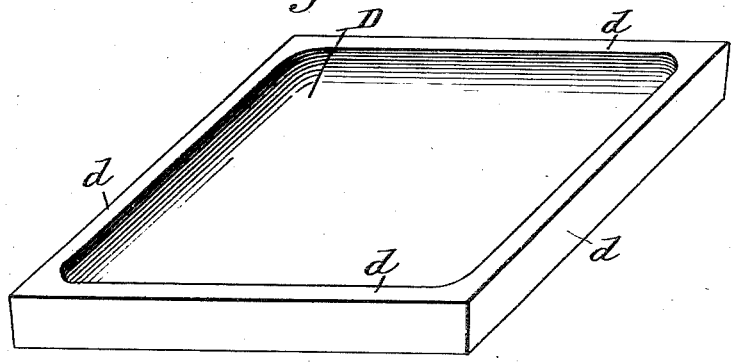
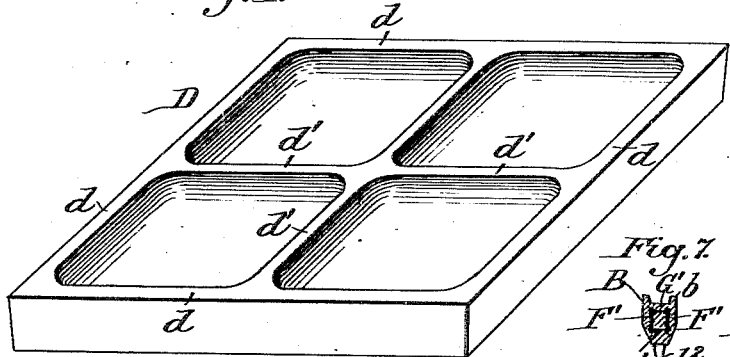
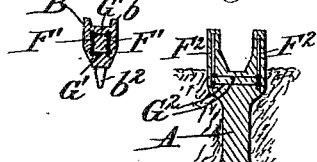
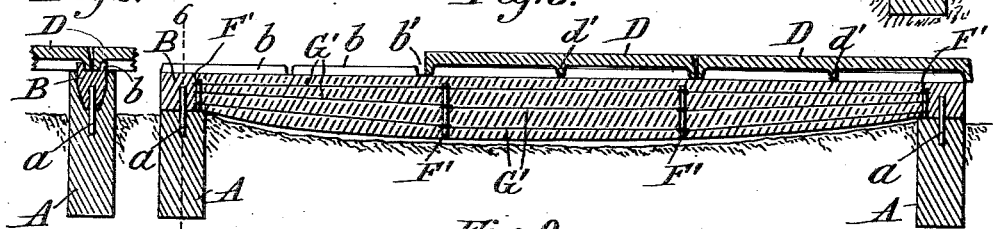
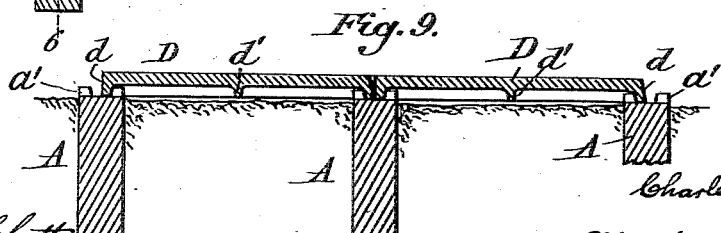
Inventor
Charles H. Platt
By Philipp, Sawyer, Rice & Kennedy,
his Attorneys
Witnesses
F. H. Schott No. 776,419. PATENTED NOV. 29, 1904.
C. H. PLATT.
PAVEMENT.
APPLICATION FILED OCT. 21, 1903.
NO MODEL.
4 SHEETS—SHEET 3.
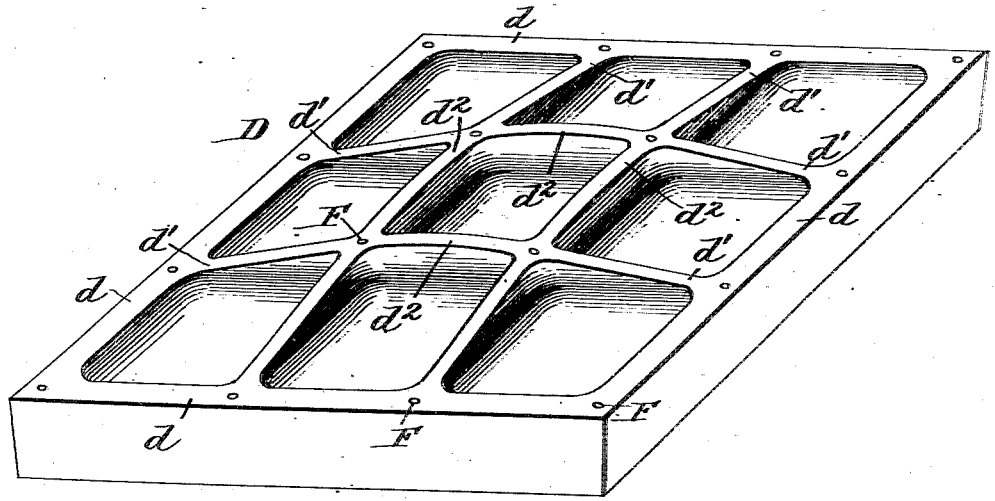
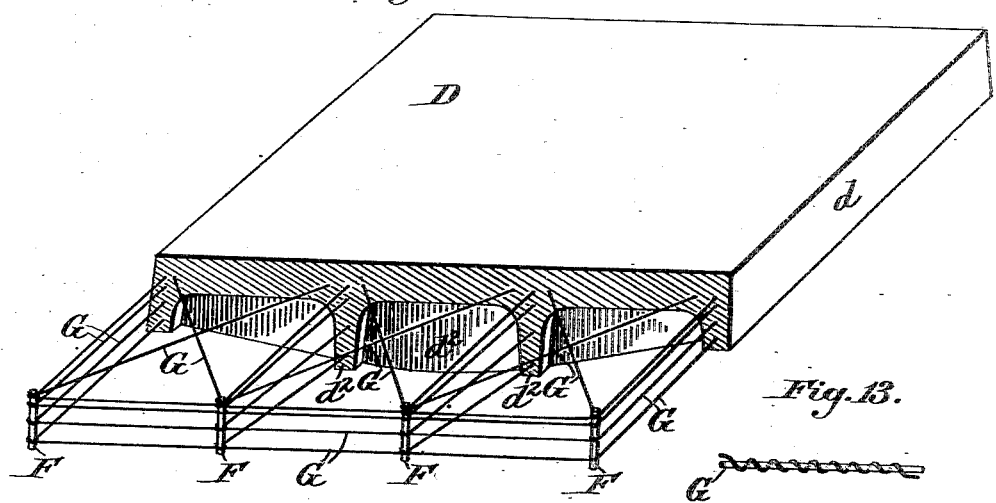
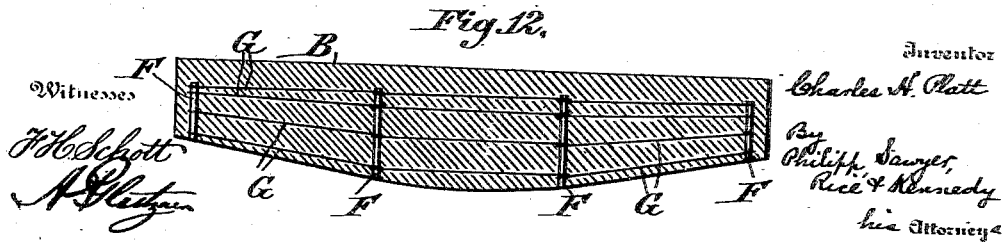
Witnesses
Inventor
Charles H. Platt
By Philipp, Sawyer, Rice & Kennedy
his Attorneys No. 776,419. PATENTED NOV. 29, 1904.
C. H. PLATT.
PAVEMENT.
APPLICATION FILED OCT. 21, 1903.
NO MODEL. 4 SHEETS—SHEET 4.
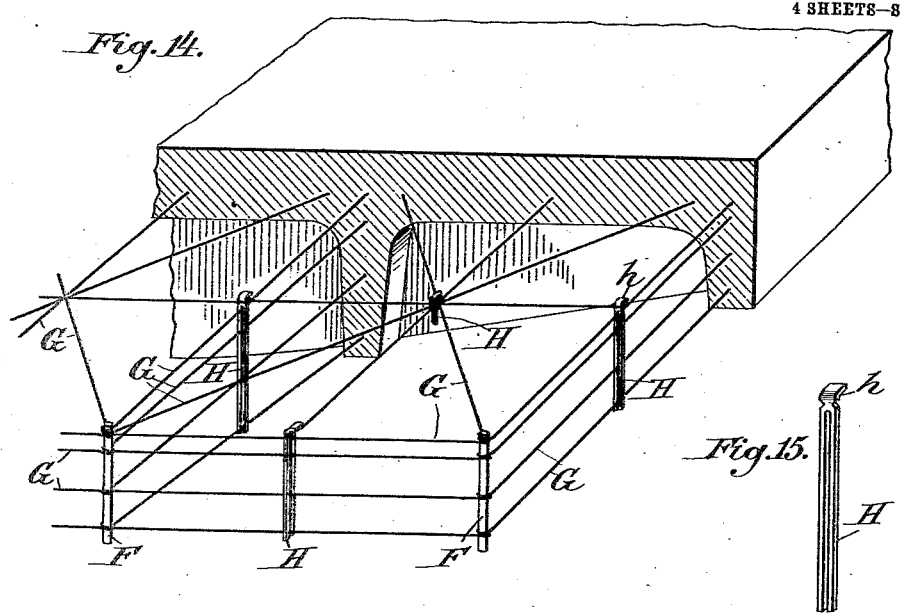
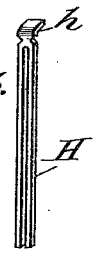
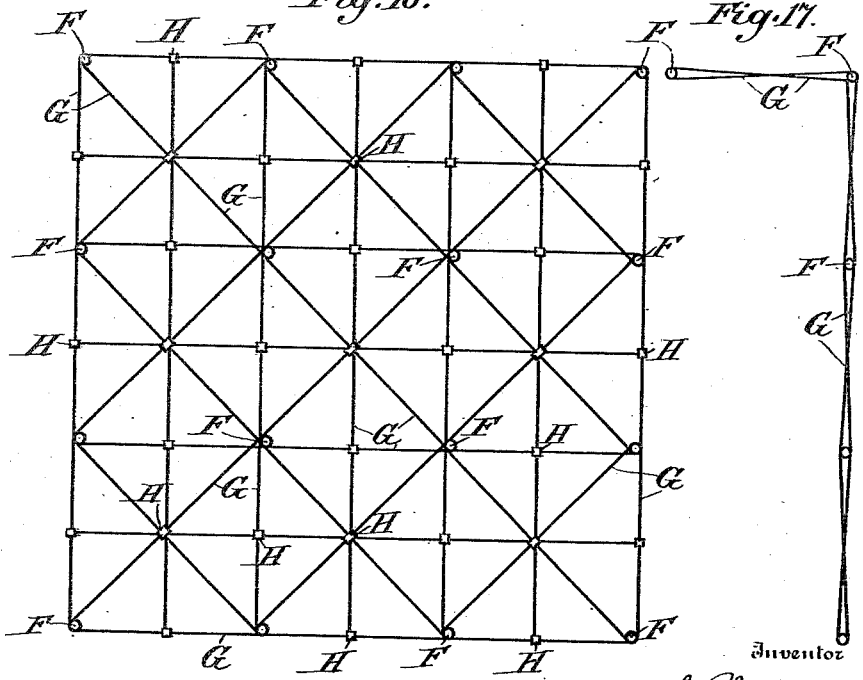
Witnesses
F. H. Schott
Inventor
Charles H. Platt
By Philipp, Sawyer, Rice & Kennedy
his Attorneys No. 776,419. Patented November 29, 1904.

UNITED STATES PATENT OFFICE.

CHARLES H. PLATT, OF LANGHORNE, PENNSYLVANIA.

PAVEMENT.

SPECIFICATION forming part of Letters Patent No. 776,419, dated November 29, 1904.

Application filed October 21, 1903. Serial No. 177,874. (No model.)

*To all whom it may concern:*

Be it known that I, CHARLES H. PLATT, a citizen of the United States, residing at Langhorne, Bucks county, Pennsylvania, have invented a certain new and useful Improvement in Pavements; and I do hereby declare the following to be a full, clear, and exact description of the invention, such as will enable others skilled in the art to which it appertains to make and use the same.

My invention relates to an improvement in pavements, and in particular to pavements for sidewalks.

The object of my invention is to provide a pavement having all the advantages of the usual concrete sidewalks which are laid in a plastic condition, while at the same time avoiding the disadvantages arising from such a method of construction of a sidewalk.

With these general objects in view a sidewalk embodying my invention comprises a series of parts which may be produced by factory methods of construction as contradistinguished from sidewalks which are manufactured on the ground—that is, laid in a plastic condition—the said parts embracing supporting means which may be set in place quickly in such a manner as to extend below the frost-line and arranged to carry paving-plates which form the wearing-surface, the whole being so arranged and constructed that, if desired, the pavement when completed will form one homogeneous mass which will be solid and durable.

The preferred forms of my invention will now be described in connection with the accompanying drawings, in which—

Figure 1:
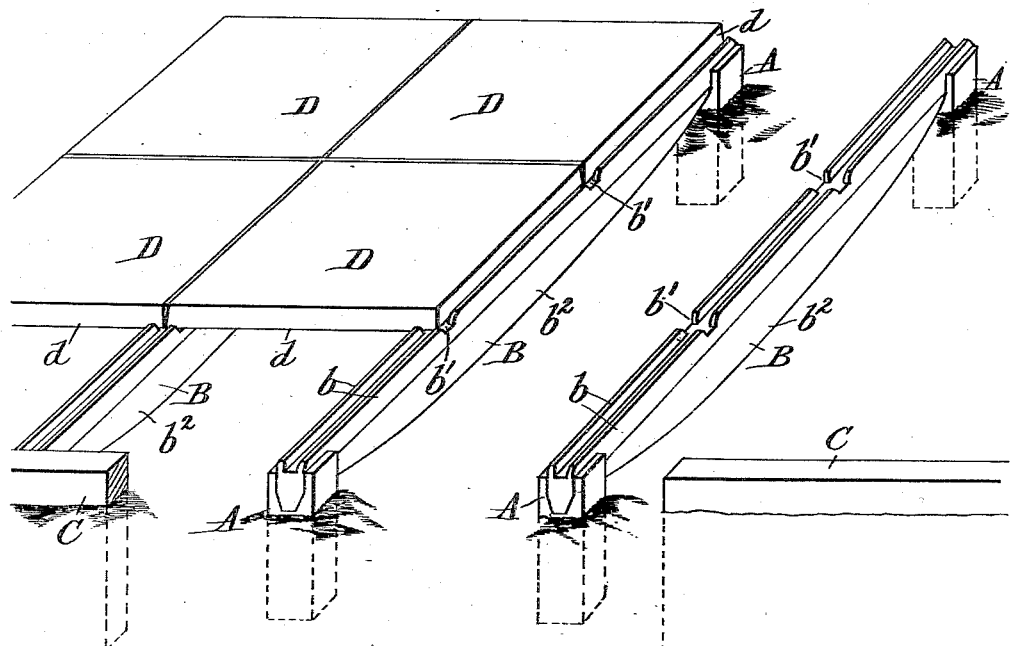
Figure 2:
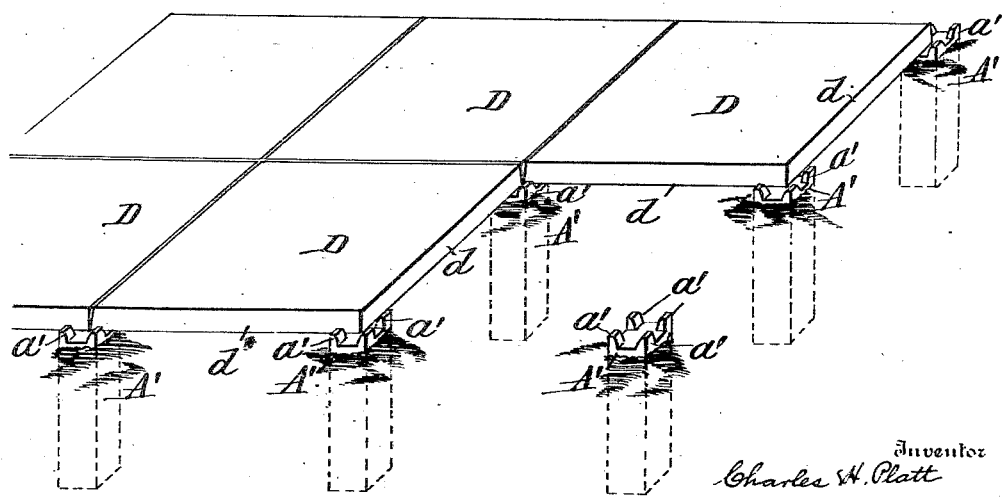

Figure 1 is a perspective view illustrating one form of sidewalk (in course of construction) embodying my invention; Fig. 2, a similar view of another embodiment of my invention; Fig. 3, a bottom perspective view of one form of paving-plate, and Fig. 4 a similar view of another form of paving-plate employed by me; Fig. 5, a sectional view through the structure shown in Fig. 1, one of the paving-plates being omitted; Fig. 6, a transverse section on the line 6 6, Fig. 5; Fig. 7, a detail transverse section through one end of a girder provided with a double system of reinforcing devices; Fig. 8, a detail sectional view through a post of modified construction; Fig. 9, a sectional view of a sidewalk such as is shown in Fig. 2; Fig. 10, a bottom perspective view of another form of paving-plate employed by me; Fig. 11, a perspective view, partly in section, of the paving-plate shown in Fig. 10, illustrating the preferred method of reinforcing the paving-plates; Fig. 12, a longitudinal section through one of the ribs of said plate; Fig. 13, a detail view showing one form of tension device employed by me; Fig. 14, a view similar to Fig. 11, illustrating a modified form of the reinforcing means; Fig. 15, a detail perspective view of one of the pegs employed by me; Fig. 16, a plan view showing one method of arranging the tension device in carrying out my invention, and Fig. 17 a detail view of a modification.

Referring to the drawings, and in particular to Fig. 1, A represents posts formed of any suitable material, but most advantageously of concrete, and each provided at the upper end with a fork or recess. The length of each post is such that when set in place in the ground its lower end will be below the frost-line, while its upper end will extend just above the surface of the ground.

B represents girders, also most advantageously formed of concrete and arranged to be supported by the posts A, the ends of the said girders being suitably formed so as to enter and rest in the recesses in the corresponding posts.

In the portion of sidewalk shown in Fig. 1 the posts are arranged in sets of two, one post of each set being placed at the curb of the sidewalk, a portion of which curb is indicated at C, while the other post of each set is located at the property-line, each girder being supported by two posts and extending transversely to and substantially the full width of the sidewalk, the said girders being parallel with each other and arranged to carry paving-plates D, which each extend from one girder to the next adjacent one, thus bridging over the space between adjacent girders. Each girder is provided with means for interlocking it to the respective paving-plates which it supports, said means consisting, preferably, of suitable projections engaging the respective paving-plates.

In the preferred form of construction shown in Fig. 1 each girder has a pair of upper longitudinal ribs $b$, provided at intervals with notches $b'$, the purpose of which ribs and notches will be more fully explained hereinafter. In addition it is provided with a lower rib or fin $b^2$, extending longitudinally along the center of its under surface, whereby the girder is greatly strengthened.

Each paving-plate D is provided on its four margins with downward-projecting side flanges $d$, two of which side flanges extend parallel to the girders B and the other two at right angles to the girders. The two side flanges which are parallel to the girders rest in the spaces between the ribs of the corresponding girders, while the side flanges which are transverse to the girders extend into the corresponding notches in the ribs of said girders.

For the purpose of uniting the girders B firmly to the posts A a suitable cement only may be employed. Preferably, however, I provide each post with a hole for a dowel-pin and also provide each end of the girders with corresponding holes. When putting the pavement in place, a dowel-pin $a$ is inserted in the holes in the post, as will be clear from Fig. 6, and the projecting end of the dowel-pin enters the corresponding hole in the girder. When these dowel-pins are used, it is advisable also to supply a suitable amount of cement between the post and girder in order to cement them together and prevent the entrance of water. Also in laying the paving-plates in place on the girder cement is used to join the girder and plates and also to join the respective plates where they meet. For the latter purpose each paving-plate has two of its sides—viz., one side parallel to the girders and one side at right angles thereto—beveled slightly, while the contiguous sides of the adjacent plates are straight, thereby producing a groove into which the cement may be inserted readily after the paving-plates are laid in place, as will be clear from Fig. 5 of the drawings, while at the same time the lower edges of the plates are in close contact and prevent the cement from running out of the groove. By thus cementing together the various parts of the pavement I form said parts into one homogeneous mass, thus producing a sidewalk of the desired monolith construction. In order, however, to allow for any expansion and contraction which might occur in the pavement and at the same time to permit portions of the pavement to be taken up when necessary without injury to the remainder of the pavement, I employ a suitable elastic cement—such, for example, as bituminous or mastic cement. By this means I obtain all the advantages of a monolith construction without its disadvantages.

In Figs. 2 and 9 I have shown a modified embodiment of my invention wherein the girders are dispensed with, the means for supporting the paving-plates consisting of posts only. These posts $A'$ differ from the parts shown in Fig. 1 in having no recesses, instead of which are provided suitable means for interlocking with the paving-plates, said interlocking means comprising four projections $a'$, each of which engages the inside of the flanges of its corresponding paving-plate, as will be clear from the drawings.

The paving-plate D, as hereinbefore described, is provided with side flanges $d$ on all of its margins, such a plate being illustrated, for instance, in Fig. 3. For plates of larger area or where greater strength is required intermediate ribs $d'$ may be employed, as shown in Figs. 4 and 10, in the first of which the plate is illustrated as provided with one rib in each direction—viz., longitudinally and transversely—while in Fig. 10 two such ribs in each direction are employed. Moreover, to still further increase the strength of the plate—as, for example, when made of large area—the ribs may be increased in depth toward the center, as shown at $d^2$, Fig. 10.

The intermediate ribs which extend transversely to the girders, it is to be noted, serve not only for the purpose of strengthening the plate, but in addition perform the added function of interlocking devices, since they engage notches formed in the ribs of the girders. A girder provided with such additional notches is shown in Fig. 5.

In order to still further add strength to the structure without increasing its weight, I provide the various parts with reinforcements of metal, and the particular means by which I obtain such metallic reinforcement at a low cost for material and construction constitutes an essential feature of my invention.

Referring to Figs. 11 and 12, F represents pins inserted in the paving-plate during the process of forming said plate, the lower ends of said pins being flush with the lower edges of the side flanges and ribs, respectively, of said plate, one post being placed at each intersection of the ribs or of the ribs and side flanges. The pins F are united by tension members, consisting of wire-strands G, which extend lengthwise through the side flanges and also through the ribs, if desired, where the latter are employed, as will be clear from Figs. 11 and 12. The wires G may also be carried in a series located substantially in a plane parallel to the surface of the paving-plate, as shown in Figs. 11 and 16, the strands crossing each other in any desired manner, so as to form a series of tension devices, but not twisted or bent at any point throughout their span, whereby said strands are capable of transmitting in a straight line to their respective posts any strain to which they may be subjected.

In order to still further increase the number of tension devices without increasing the number of posts, a slotted peg H, having suitable means for holding the wires—as, for example, a hooked head $h$, as shown in Fig. 15—may be used, this peg being pushed down into the plastic concrete, straddling the wires of the ribs or side flanges, its hooked head serving as a point of attachment for tension-wires intermediate those connected to the posts. (See Fig. 14.) Moreover, such a peg may be used as a binder to unite several intersecting wires at their point of intersection to the concrete. Such a use of the peg is shown in said Fig. 14.

It will be noted that in a paving-plate made and reinforced in accordance with my invention the side flanges serve as compressive members to hold the pins F at the proper distance apart, while the pins serve as anchoring devices for the wires, which act as tension devices to transmit the load to the pins, the total load being distributed to the foundations by those pins which rest upon the foundations—viz., all those pins which project flush with the lower surface of the side flanges resting on the girders or in the construction shown in Fig. 2 those pins which are at the corners of the paving-plate. Thus the side flanges are relieved of the downward strain to which they would otherwise be subjected, and consequently can be made lighter than would be necessary if the pins F were not employed. Moreover, the wires in the side flanges serve to tie them to each other, so that they cannot be spread or broken outward by any strains to which they may be submitted in practice. Owing to the fact that the side flanges and metal reinforcements form a panel complete in itself, with a sheet of wires across its top, the concrete plate may be made quite thin because it is not compelled to resist any tensile strains and serves principally as a wearing-surface for the pavement, although at the same time also acting as a compression member to strengthen the panel by assisting in holding the side flanges apart. Consequently a plate made in accordance with my invention is fully capable of withstanding all the shocks and strains to which it may be submitted in handling and when laid in the pavement, while at the same time being light enough to be readily handled even when plates are made of a size sufficient for large spans between the points of support. The girders may also be reinforced in a manner similar to that in which the ribs of the paving-plate are reinforced, and a girder so constructed is illustrated in Fig. 5, wherein F' indicates the pins, and G' the tension-wires, the pins at the ends of the girders being located so as to come over the supports for the girders—that is to say, in the present instance to be over the posts on which the girders rest—in which case it is advantageous to have the lower ends of said end pins extend flush with the lower bearing-surface of the girder in order that said pins may serve as compressive members to transmit any load from their respective wires directly to the supports or posts.

Instead of employing only one longitudinal set of tension-wires and pins a plurality of such sets may be used—as shown, for example, in Fig. 7—in which case the posts are also connected by transverse tension devices. By this construction the danger of the upper corners of the girder shearing or splitting off is avoided. In this way it is possible to produce a much lighter girder for the same strength than would otherwise be possible, while at the same time the cost of the reinforcement is inappreciable.

To reinforce the posts, the same general system of pins and wires may be employed, a post so constructed being shown in Fig. 8, wherein $F^2$ indicates the pins and $G^2$ the wires, this system of reinforcing devices preventing the upper edges of the posts from splitting off. By this construction it is possible to make the posts sufficiently strong for the purpose intended without making them heavy. In order to still further reduce the weight of said posts and at the same time to give them an added bearing-surface in the ground, I reduce the transverse cross-section of the posts intermediate its two ends, as shown in said Fig. 8, whereby when the soil is tamped tightly against the post the area of the support due to the ground is increased, owing to the outward flare of the upper end or head of the post.

While I have thus far described the tension members as plain wires, it is sometimes of advantage to construct said tension members of a compound wire, preferably consisting of a plain wire with another wire or wires wrapped spirally around it. A portion of such a compound wire is shown, for example, in Fig. 13. By this arrangement the concrete is given a good hold on the tension member, whereby a firm connection between the concrete and wire results, while at the same time the plain wire is not weakened or injured, as it would be if intertwined with the second wire or wires.

In the arrangement shown in Fig. 17 the wire is wrapped around the pins in such a way as to run from the outside of one pin to the inside of the next pin and is carried back in the reverse manner, so that the two strands cross each other substantially half-way between the pins. This arrangement gives a good hold for the concrete, and hence materially strengthens the structure.

The reinforcement of the hardened plastic material by means of wires has also the important advantage that the various tension members extending from one point of anchorage to another may all constitute one continuous wire, which may be wound back and forth around the pins and built up in the plastic material intermittingly during the operation of molding the same, and hence without interfering with the proper ramming of the plastic material. Moreover, as many strands as desired may be extended from one anchorage to another without inconvenience or delay, thus enabling the total cross-sectional area of the tension members to be varied as may be necessary to endure the strain to which each part of the structure is intended to withstand.

It is to be noted that a pavement made in accordance with my invention may be quickly laid, requires but a small amount of excavation, is not subjected to the heaving action of the frost, and is ready for use as soon as put in place. Furthermore, in case it becomes necessary to take up a portion of the pavement—as, for example, to lay water, gas, or sewer pipes—this can be done quickly and economically, and when the pavement is replaced no evidences of the taking up and relaying of the pavement are visible. This is an important advantage over the ordinary concrete pavement, which when partially taken up and replaced is disfigured by the unsightly patches in it.

A further important advantage of a sidewalk made in accordance with my invention is that it is in most cases possible to tunnel under the sidewalks to lay such sewer, gas, or water pipes without in any way disturbing or injuring the sidewalk, it being only necessary to drive the tunnel at a place intermediate the posts.

It is to be observed that in the construction shown in Fig. 1 the paving-plates rest upon the girders and the girders rest upon the posts, while in the construction shown in Fig. 2 the paving-plates rest directly upon the posts. In both constructions, however, the paving-plates are supported or carried by the posts, and it is to be understood that when the expression "paving-plates supported by the posts" is employed in the claims it is intended to embrace both constructions.

Having thus fully described my invention, what I claim as new, and desire to secure by Letters Patent, is—

1. In a sidewalk, the combination, with a plurality of posts of concrete extending below the frost-line and above the ground, of detachable paving-plates supported by said posts.

2. In a sidewalk, the combination, with a paving-plate having flanged sides, of means for supporting said plates, said means being arranged to interlock with the flanged sides.

3. In a sidewalk, the combination, with a paving-plate having flanged sides, of a girder arranged to support the plate and provided with projections engaging the flanged sides of said plate.

4. In a sidewalk, the combination, with a plurality of posts, of girders supported by said posts, paving-plates supported on said girders, and means for interlocking said plates and girders.

5. In a sidewalk, the combination, with a paving-plate provided with one member of an interlocking device, of supporting means arranged to carry said plate and provided with the other member of said interlocking device arranged to coact with the member on the paving-plate, whereby the latter is locked to the supporting means.

6. In a sidewalk, the combination, with a plurality of posts, of girders supported by said posts, each girder having longitudinal ribs provided with notches at intervals, and paving-plates provided with side flanges, arranged to engage the longitudinal ribs of adjacent girders and to enter the respective notches in said ribs.

7. In a sidewalk, the combination, with a plurality of posts each having a recess in its top, of girders arranged to rest in said recesses and each provided on its upper surface with a pair of longitudinal ribs having notches at intervals, and paving-plates provided with side flanges, one pair of said flanges resting on adjacent girders between the respective ribs, the other pair of side flanges engaging the respective notches in the ribs of the said girders.

8. The combination, with a plurality of posts extending below the frost-line and above the ground, of girders supported by said posts and detachable paving-plates carried on said girders.

9. The combination, with a plurality of posts extending below the frost-line and above the ground, of detachable girders supported by said posts and detachable paving-plates carried by said girders.

10. The combination, with a structure of hardened plastic material, of pins inserted therein, tension-wires connected to and extending between said pins, slotted pegs straddling said wires, and additional tension-wires connected to said pegs and extending through the hardened plastic material.

11. The combination, with a structure of hardened plastic material, of reinforcing devices extending through said hardened plastic material and comprising a plain wire around which is coiled a second wire.

12. The combination, with a structure of hardened plastic material, of anchorage devices within said hardened plastic material, and tension members within said hardened plastic material and connected to and extending between said anchorage devices, said tension members comprising a straight wire surrounded by a coiled wire.

13. The combination, with a structure of hardened plastic material, of a plurality of anchorage devices held apart by said hardened plastic material, and tension members connected to and extending between said anchorage devices from the outside of one anchorage device to the inside of the next and returning in a reverse manner, whereby the tension members cross between the anchorage devices.

14. The combination, with girders, means for supporting said girders, and paving-plates located on said girders and formed of hardened plastic material, of elastic cement between said plates and between the plates and girders.

15. The combination, with a plurality of paving-plates, of supporting means arranged to carry said plates and to interlock with each of them.

16. The combination, with a plurality of girders, and a plurality of paving-plates resting on each girder, of means for interlocking said girders and plates, and means for supporting the girders.

17. The combination, with a girder and paving-plates meeting on and carried by said girders, of means for interlocking said plates and girder, and means for supporting said girder.

18. In a sidewalk, the combination, with a plurality of posts, of detachable paving-plates supported by said posts.

19. In a sidewalk, the combination, with a paving-plate having downward projections, of supporting means for said plates, said supporting means being arranged to interlock with the downward projections of said plates.

20. In a sidewalk, the combination, with a paving-plate having downward projections, of a girder arranged to support said plates and to interlock with the downward projections of the plates, and means for supporting said girder.

21. In a sidewalk, the combination, with a plurality of posts extending below the frost-line and above the ground, of detachable paving-plates supported by said posts.

22. In a sidewalk, the combination, with a plurality of posts extending below the frost-line and above the ground, of girders supported by said posts, and detachable paving-plates supported by said girders.

23. The combination, with a girder provided with notches, and means for supporting said girders, of plates having downward-extending ribs arranged to enter said notches.

24. The combination, with a girder provided with notches, and means for supporting said girder, of plates provided with flanged sides and ribs, said flanged sides and ribs being arranged to enter said notches.

25. The combination, with girders provided with longitudinal ribs and notches, and means for supporting said girders, of plates having all of their sides flanged, and having downward-extending ribs, the flanged sides parallel to the girders being arranged to rest between the longitudinal ribs of the respective girders while the downward-extending ribs and the flanged sides at right angles to the girders enter the respective notches.

26. A girder having a downward-extending rib, in combination with plates supported by said girder.

27. A girder of hardened plastic material having a downward-extending rib, in combination with plates supported by said girder.

28. A girder having enlarged ends and a downward-extending rib, in combination with plates supported by said girder.

29. A girder of hardened plastic material having a downward-extending rib, in combination, with reinforcing means within said rib, and plates supported by said girder.

30. A girder of hardened plastic material having enlarged ends and a downward-extending rib, in combination, with reinforcing means within said rib, and plates supported by said girder.

31. A girder of hardened plastic material having enlarged ends and a downward-extending rib, in combination, with anchorage devices in said enlarged ends, tension members connected to said anchorage devices and extending through the rib, and plates supported by said girder.

32. A girder of hardened plastic material having a downward-extending rib, in combination, with anchorage devices located in the girder near its ends, tension members connected to said anchorage devices and extending through the rib, and plates supported by said girder.

33. A girder of hardened plastic material having a downward-extending rib, in combination with anchorage devices in the girder near its ends, anchorage devices within the rib, tension members connected to and extending between said anchorage devices, and plates supported by said girder.

34. A post of hardened plastic material having its upper end provided with reinforcing means, in combination with plates carried by said post.

35. A post of hardened plastic material having a forked upper end and reinforcing means in said forks, in combination with a girder resting in said forked end, and plates carried by said girder.

36. A post of hardened plastic material having a forked upper end, anchorage devices extending into each fork, and tension members connecting said anchorage devices, in combination with a girder resting in said forked end, and plates carried by said girder.

37. A post of hardened plastic material having a forked upper end, in combination with a girder resting in said forked end, and plates carried by said girder.

38. A post of hardened plastic material having its lower portion reduced in cross-section, in combination with plates carried by said post.

39. A post of hardened plastic material having a forked upper end and a lower portion reduced in cross-section to form a shoulder beneath the fork, in combination with a girder resting in said forked end, and plates carried by said girder.

40. A post of hardened plastic material, a girder arranged to be carried by said post and a dowel-pin connecting said post and girder, in combination with plates carried by said girder.

41. A post of hardened plastic material having a forked upper end, a girder of hardened plastic material arranged to rest between the forks of the post, and a dowel-pin connecting said post and girder, in combination with plates carried by said girder.

In testimony whereof I affix my signature to this specification in the presence of two witnesses.

CHARLES H. PLATT.

Witnesses:
M. C. MASSIE,
ALBANUS S. T. JOHNSON.